United States Patent
Park

(10) Patent No.: US 7,278,743 B2
(45) Date of Patent: *Oct. 9, 2007

(54) SINGLE PANEL ILLUMINATION SYSTEM AND PROJECTION DISPLAY APPARATUS USING THE SAME

(75) Inventor: Jong Myoung Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 144 days.

This patent is subject to a terminal disclaimer.

(21) Appl. No.: 11/131,837

(22) Filed: May 18, 2005

(65) Prior Publication Data

US 2005/0286021 A1   Dec. 29, 2005

(30) Foreign Application Priority Data

Jun. 24, 2004   (JP)   .................. 10-2004-0047566

(51) Int. Cl.
| | |
|---|---|
| G03B 21/14 | (2006.01) |
| G03B 21/20 | (2006.01) |
| G03B 21/26 | (2006.01) |
| G03B 21/28 | (2006.01) |
| G02F 1/1335 | (2006.01) |
| H04N 9/12 | (2006.01) |
| H04N 5/74 | (2006.01) |
| G02B 5/28 | (2006.01) |
| G02B 5/30 | (2006.01) |
| G02B 27/14 | (2006.01) |
| G02B 27/28 | (2006.01) |

(52) U.S. Cl. .................. 353/20; 353/31; 353/37; 353/84; 353/102; 349/9; 359/497; 359/502; 359/589; 359/634; 348/742; 348/759

(58) Field of Classification Search .................. 353/20, 353/31, 33, 34, 37, 81, 82, 84, 102, 634; 349/5–9; 359/495, 497, 502, 589, 629; 348/742, 348/744, 759, 761, 771
See application file for complete search history.

(56) References Cited

U.S. PATENT DOCUMENTS

| | | |
|---|---|---|
| 5,786,873 A | 7/1998 | Chiu et al. |
| 6,557,999 B1 | 5/2003 | Shimizu |
| 2004/0057019 A1* | 3/2004 | Sokolov .................. 353/31 |

FOREIGN PATENT DOCUMENTS

JP   09251150   9/1997

* cited by examiner

*Primary Examiner*—Rochelle Blackman
(74) *Attorney, Agent, or Firm*—Lee, Hong, Degerman, Kang & Schmadeka

(57) ABSTRACT

The present invention provides an illumination system and projection system using the same. The present invention can eliminate the reflective light on the internal optical surface of the optical system, using the phase plate and linear polarizer, in the color sequential driving of illuminating at least two colors on the single display panel at a random moment. The phase plate converts the incident light from a linearly polarized light to a circularly polarized light, and vice versa. And, the linear polarizer transmits the linearly polarized light of the incident light in the specific direction. Therefore, the present invention prevents the degradation of color purity generated from the mutual intrusion of light of at least two colors, thereby enhancing quality of color image.

21 Claims, 9 Drawing Sheets

T=0

T=T1

T=T2

T=T2

T=T1

T=0

SINGLE PANEL ILLUMINATION SYSTEM AND PROJECTION DISPLAY APPARATUS USING THE SAME

This application claims the benefit of the Korean Application No. 10-2004-0047566 filed on Jun. 24, 2004, which is hereby incorporated by reference.

BACKGROUND OF THE INVENTION

1. Field of the Invention

The present invention relates to a projection system, and more particularly, to a single panel illumination system and projection display apparatus using the same, by which color purity is enhanced.

2. Discussion of the Related Art

Recently, a display device has a tendency for developing into its lightweight, slim size and wide screen, and more particularly, its lightweight and slim size become a matter of concern.

To achieve the light weight and slim size, a projection display instrument needs to employ a single panel illumination system using one display panel instead of a 3- or 2-panels illumination system using three display panels.

The single panel illumination system enables low price, lightweight and slim size which are smaller than those of the 3-panels illumination system. Yet, the single panel illumination system implements separation/synthesis of the three primary colors, red, blue and green of light by color sequential driving, thereby having radiation intensity lower than that of the 3-panels illumination system.

To supplement such a disadvantage of the single panel illumination system, color scrolling methods of implementing color by illuminating at least two kinds of color on a display panel instantly have been devised.

FIGS. 1 to 4 are configurational diagrams of illumination systems of a single panel projection display device using a rotating prism, color wheel or color drum according to a related art. And, FIG. 5 and FIG. 6 are diagrams for representing color variations of illuminating light on a single display panel of the projection display device according to a time, in which a color scrolling method of implementing three colors on the panel instantly is exemplarily shown.

FIG. 1 is a configurational diagram of an illumination system of a single panel projection display device using three rotating prisms.

Referring to FIG. 1, a reference number 101 indicates a light source and reference numbers 102 and 103 indicate fly eye lenses, respectively. Reference numbers 106, 108, 115 and 118 indicate first to fourth dichroic mirrors transmitting or reflecting light of a specific wavelength band, respectively. Reference numbers 110 and 112 are total reflection mirrors of reflecting incident light unconditionally, respectively. And, reference numbers 113, 114 and 109 are first to third rotating prisms diverting a light path according to a rotating angle, respectively. In this case, the first dichroic mirror 106 has a red light reflection characteristic and a green and blue light transmission characteristic by dichroic coating. The second dichroic mirror 108 has a green light reflection characteristic and a blue light transmission characteristic by dichroic coating. The third dichroic mirror 115 has a green light reflection characteristic and a red light transmission characteristic by dichroic coating. And, the fourth dichroic mirror 118 has a red and green light reflection characteristic and a blue light transmission characteristic by dichroic coating.

Namely, white light projected from the light source 101 is split into cell units by a first fly eye lens (FEL) 102 and a second fly eye lens (FEL) 103 to be condensed on a specific portion of a PBS array 104. The PBS array 104 splits incident light into linearly polarized lights having an optical axis each, and more particularly, into an S-wave and a P-wave to project the S-wave to a condensing lens 105. In doing so, the P-wave is converted to an S-wave by a ½λ plate (not shown in the drawing) partially attached to a backside of the PBS array 104 and is then projected on the condensing lens 105. The condensing lens 105 condenses the light projected from the PBS array 104 and then projects the condensed light to the first dichroic mirror 106. The dichroic mirror is operative in splitting incident light by reflection/transmission according to a wavelength band. For instance, the first dichroic mirror 106 reflects red light of the incident light but transmits green light and blue light.

The red light reflected on the first dichroic mirror 106 proceeds to the total reflection mirror 112 via another condensing lens 111. The total reflection mirror 112 totally reflects the incident red light to the first rotating prism 113 as it is.

And, the green and blue lights transmitted through the first dichroic mirror 106 proceed to the second dichroic mirror 108 via another condensing lens 107. The second dichroic mirror 108 reflects the incident green light and transmits the incident blue light. The green light reflected on the second dichroic mirror 108 proceeds to the second rotating prism 114 and the transmitted blue light proceeds to the third rotating prism 109.

Each of the first to third rotating prisms 113, 114 and 109 has a rectangular shape. And, the first to third rotating prisms 113, 114 and 109 are situated on light paths of the R, G and B lights, respectively. The first to third rotating prisms 113, 114 and 109 change proceeding directions of the R, G and B lights according to their rotating angles, respectively. In other words, the first to third rotating prisms 113, 114 and 109 are independently turned to change imaging positions of the R, G and B lights imaged on a display panel (e.g., LCD or DMD) 121 according to their rotating angles, respectively and scroll the imaging positions of the lights of here color sequentially.

The red light having been transmitted through the first rotating prism 113 is transmitted through the third dichroic mirror 115 to proceed to the fourth dichroic mirror 118, while the green light having been transmitted through the second rotating prism 114 is reflected on the third dichroic mirror 115 to proceed to the fourth dichroic mirror 118. Moreover, the blue light having been transmitted through the third rotating prism 109 proceeds to the fourth dichroic mirror 118.

The fourth dichroic mirror 118 reflects the red and green lights and transmits the blue light to be projected on the PBS 120 via the condensing lens 119. The PBS 120 transmits the incident R, G and B lights so that the transmitted lights can proceed to the display panel 121.

In doing so, since the initially set rotating angles of the first to third rotating prisms 113, 114 and 109 are different from each other, the R, G and B lights are imaged on different portions of the display panel 121, respectively to be scrolled in a predetermined direction according to being driven. As the imaging positions are scrolled fast, the display panel 121 scrolls R, G and B signals according to the incident R. G and B lights. Hence, 3-color light signal is sequentially implemented on each pixel of the display panel 121. And, the implemented 3-color light signal is integrated by time to display a color image. The image implemented on the display panel 121 is enlarged to be projected on a screen via the PBS 120 and a projection lens (not shown in the drawing).

A process of scrolling an R/G/B color bar by rotations of the first to third rotating prisms 114, 114 and 109 is shown in FIG. 5, in which a color bar provided to a surface of the display panel 121 is periodically moving when the synchronized prisms corresponding to the respective colors are rotated. For instance, if the R/G/B color bar is formed on the display panel 121, a color image of one frame is formed when the R/G/B color bar, as shown in FIG. 5, is circulated once.

FIG. 2 is a configurational diagram of an illumination system of a single panel projection display device using a color wheel, in which reference numbers 201, 202 and 203 indicate a light source, an integrator and a color wheel, respectively.

White light projected from the light source 201 is homogenized in the integrator and polarized light converter 202 to be converted to a linearly polarized light having one optical axis to proceed to the color wheel 203.

Color pieces of the color wheel 203 rotate centering on an axis of the color wheel 203 to cut off the polarized incident light sequentially. After having passed through the color wheel 203, the incident light is sequentially changed into lights of R, G and B colors. Namely, the color wheel 203, which consists of a series of the color pieces of R, G and B transmission filters, is rotated by such a driving means as a motor to split the incident light into R, G and B colors on a time basis and then scrolls the respective split R, G and B colors sequentially to implement colors.

The light beam of which colors are split by the color wheel 230 is sequentially passed through an illumination lens array 204 and a PBS (polarizing beam splitter) 205 or TIR prism to proceed to a display panel 206. And, the display panel implements an image to correspond to the incident R, G and B lights. Namely, as the color wheel 203 is rotated, the R, G and B lights are sequentially scrolled on the display panel 206.

The image implemented on the display panel 206 is enlarged to be projected on a screen via the PBS or TIR (total internal reflection) prism 205 and a projection lens (not shown in the drawing). Hence, a viewer can recognize a synthesized color image that is formed by averaging a specific color projected on the screen according to a time basis.

A process that the R/G/B color bar is scrolled by the rotation of the color wheel 203 is shown in FIG. 6.

Referring to FIG. 6, if the R/G/B color bar is formed on the display panel 206, a color image of one frame is formed after completion of one circulation of the R/G/B color bar for example.

FIG. 3 shows an illumination system of a single panel projection display device using a color drum, in which reference numbers 300, 310 and 320 indicate a light source, a polarizing converting unit and a color drum, respectively.

Referring to FIG. 3, the polarizing converting unit 310 consists of a first FEL 311, a second FEL 312, an illumination lens array 314, and a TIR prism or total reflection mirror 315.

First of all, while light projected from the light source 300 is split into cell units by the first and second FELs 311 and 312 of the polarizing converting unit 310 to be condensed on a specific portion of the PBS array 313. The PBS array 313 polarizes the non-polarized white light in one direction (P- or S-wave direction) to be projected on the illumination lens array 314. The illumination lens array 314 condenses the light projected from the PBS array 313 to project to the TIR prism 315. The TIR prism 315 then diverts a proceeding path of the incident light by total reflection to make it pass through the color drum 320 which is rotating.

The color drum 320 is provided with a cylindrical transmission plate and dichroic coating is processed on the transmission plate to allow R, G or B light to be selectively transmitted. The color drum 320 is rotated at a predetermined speed by a rotational driving means such as a motor to split the incident light into R, G and B lights and to sequentially irradiate the split R, G and B lights on a display panel 370 via lens arrays 330, 340 and 350 and a PBS 360. Namely, the R, G and B lights are sequentially scrolled on the display panel 370 as the color drum 320 is rotated. An image implemented on the display panel 370 is enlarged to be projected on a screen via the PBS 360 and a projection lens.

FIG. 4 shows another example of an illumination system of a single panel projection display device using a color drum, in which reference numbers 401, 402 and 403 indicate a light source, a polarizing converting unit and a color drum, respectively. The polarizing converting unit 402 may consist of a PCCR (polarization converting and color recapturing) integrator.

Referring to FIG. 4, white light projected from the light source 401 is condensed on an aperture of the PCCR integrator of the polarizing converting unit 402. The condensed light is introduced into the integrator via the aperture and is then be split into P-wave and S-wave to maintain a polarizing direction of either the P- or S-wave through transmission and reflection. A light proceeding path of the one-directionally polarized light transmitted through the polarizing converting unit 402 is diverted by a TIR prism or total reflection mirror of a projection surface to pass through the color drum 403 that is rotating. A subsequent operation is the same of FIG. 3, of which detailed explanation is skipped.

Yet, in the single panel display devices shown in FIG. 1 to FIG. 4, at least two colors are simultaneously illuminated on one panel to implement colors. Hence, one color interferes with an area of another other color on the display panel to lower color purity.

For instance, blue and green lights intrude a red area to degrade red color purity. Likewise, a green or blue area is intruded by lights of the rest two colors to degrade its color purity. Such a color purity degradation always takes place in the color implementation system of the color scrolling method of implementing lights of at least two colors on one display panel simultaneously.

A process that 1-color light intrudes an area of another color is explained with reference to FIG. 7 as follows.

FIG. 7 shows an example that green color intrudes red color in a color scrolling method of illuminating 2-color light on a panel at one arbitrary moment.

Referring to FIG. 7, white light projected from a light source 701 is homogenized and converted to a linearly polarized light having one optical axis by an integrator and polarizing converter 702 to proceed to a color separation unit 703. Any device operative in performing color separation by a color scrolling method can be used as the color separation unit 703. For instance, a color drum, a color wheel, a rotating prism or the like corresponds to the color separation unit 703. Namely, the color separation unit 703 splits the white light into lights of R, G and B areas. And, it is also assumed that the polarizing converter 202 converts the white light to a P-wave polarized light.

The R, G and B lights split by the color separation unit 703 are sequentially illuminated on a display panel 706 via an illumination lens array 704 and a PBS 705.

In FIG. 7 which shows an example of implementing an entire image by red color, an ON signal is applied to an area of the display panel having the red light illuminated thereon and an OFF signal is applied to an area of the panel having the green and blue lights applied thereto, in the color scrolling method. According to a time basis, the R, G and B lights, as shown in FIG. 5 and FIG. 6, then sequentially propagate. In doing so, the red light proceeds to a projection lens 707 via a PBS 705 only but the green and blue lights fail to proceed toward the projection lens 707.

Namely, as the P-polarized red light is illuminated on the ON area of the display panel only, a polarized direction of the red light is converted to an S-wave from a P-wave to reflect to the PBS 705.

It is assumed that the PBS 705 is coated with a polarizing film to reflect the S-wave thereon and to transmit the P-wave therethrough.

If so, the S-wave red light is reflected on the PBS 705 toward the projection lens 707. The projection lens 707 then enlarges and projects the red light reflected on the PBS 705 to a screen (not shown in the drawing).

Meanwhile, the P-polarized green and blue lights, which are illuminated on the OFF area of the display panel, are reflected toward the PBS 705 without changing their polarized direction. Namely, the green and blue lights maintaining the P-polarization to be reflected toward the PBS 705.

For convenience of explanation, the green light among the green and blue lights is explained in detail as follows.

First of all, the green light, which is reflected on the OFF area of the display panel 706 to the PBS 705 to be in the P-polarized state G_p, is transmitted through the PBS 705 to enter the illumination lens array 704 as it is.

In doing so, it may happen that a portion G_p of the green light, as shown in FIG. 7, is reflected on a random surface of the illumination lens array 704 to arrive at the red area of the display panel via the PBS 705. Since the panel signal of the red area is 'ON', the P-polarized green light G_p is converted to the green light G_s to be reflected to the PBS 705. Since the PBS is coated to reflect the S-polarized light, the S-polarized green light G_s is reflected on the PBS 705 to the projection lens 707. The projection lens 707 then enlarges to project the S-polarized green light to the red area of the screen.

Meanwhile, the blue light, on which the same process of the green light is carried out, is enlarged to be projected on the red area of the screen as well. However, in case of the related art single panel projection display device enabling color implementation by illuminating at least two kinds of lights on the display panel simultaneously, the above-explained color intrusion degrades the quality of color image.

SUMMARY OF THE INVENTION

Accordingly, the present invention is directed to a single panel illumination system and projection display apparatus using the same that substantially obviate one or more problems due to limitations and disadvantages of the related art.

An object of the present invention is to provide a single panel illumination system and projection display apparatus using the same, in which color intrusion is prevented in case of color implementation by simultaneously illuminating at least two kinds of colors on one display panel and by which a color purity degradation is prevented.

Another object of the present invention is to provide a single panel illumination system and projection display apparatus using the same, in which internal reflection occurring in an inner optical surface of an optical system is eliminated and by which a simple configuration and excellent image quality can be provided.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an illumination system according to the present invention includes a color separation unit homogenizing a non-polarized white light originated from a light source, converting the homogenized light to a polarized light in a specific direction, and splitting the polarized light into R, G and B lights by color scrolling, an illumination lens array condensing an incident light, a first phase plate arranged between the color separation unit and the illumination lens array to convert a polarized mode of the incident light, a second phase plate converting the polarized mode of the incident light, and a linear polarizer transmitting a linearly polarized light of the incident light in the specific direction, wherein the second phase plate and the linear polarizer are sequentially arranged between the illumination lens array and a display panel to eliminate a reflective light on an internal optical surface of the illumination system.

Preferably, the first phase plate is a λ/4 plate converting the linearly polarized light of the incident light to a circularly polarized light or the circularly polarized light of the incident light to the linearly polarized light.

Preferably, the second phase plate is a λ/4 plate converting the linearly polarized light of the incident light to a circularly polarized light or the circularly polarized light of the incident light to the linearly polarized light.

Preferably, polarizing directions of the first and second phase plates are arranged parallel to each other.

Preferably, polarizing directions of the first and second phase plates are arranged vertical to each other.

Preferably, the internal optical surface of the illumination system is a random surface of the illumination lens array.

Preferably, the illumination system further includes a linear polarizer between the color separation unit and the first phase plate to transmit the linearly polarized light of the incident light in the specific direction.

In another aspect of the present invention, a projection display apparatus forms an image by processing a light irradiated from an illumination system according to an inputted image signal using a single display panel and enlarges to project the image toward a screen via a projection lens, wherein the illumination system includes a color separation unit homogenizing a non-polarized white light originated from a light source, converting the homogenized light to a polarized light in a specific direction, and splitting the polarized light into R, G and B lights by color scrolling, an illumination lens array comprising at least one lens to condense an incident light, a polarized beam splitter transmitting or reflecting an incident light according to a polarized direction of the incident light, a first phase plate arranged between the color separation unit and the illumination lens array to convert a polarized mode of the incident light from a linearly polarized light to a circularly polarized light, and vice versa, a second phase plate arranged in rear of the illumination lens array to convert the polarized mode of the incident light from the linearly polarized light to the circularly polarized light, and vice versa, and a linear polarizer sequentially aligned between the second phase plate and the polarized beam splitter on a same light path to transmit the linearly polarized light of the incident light in the specific direction, wherein a reflective light on an internal optical surface of the illumination system is eliminated using the first phase plate, the second phase plate and the linear polarizer.

Preferably, the first phase plate is a λ/4 plate converting an S-wave linearly polarized light of the incident light to a right-hand circularly polarized light or a P-wave linearly polarized light of the incident light to a left-hand circularly polarized light.

Preferably, the second phase plate is a λ/4 plate converting a P-wave linearly polarized light of the incident light to a right-hand circularly polarized light or an S-wave linearly polarized light of the incident light to a left-hand circularly polarized light.

Preferably, the internal optical surface of the illumination system is a random surface of the illumination lens array.

In another aspect of the present invention, a projection display apparatus forms an image by processing a light irradiated from an illumination system according to an inputted image signal using a single display panel and enlarges to project the image toward a screen via a projection lens, wherein the illumination system includes a color separation unit homogenizing a non-polarized white light originated from a light source, converting the homogenized light to a polarized light in a specific direction, and splitting the polarized light into R, G and B lights by color scrolling, an illumination lens array comprising at least one lens to condense an incident light, a polarized beam splitter transmitting or reflecting an incident light according to a polarized direction of the incident light, a first linear polarizer behind the color separation unit to transmit a linearly polarized light of the incident light in the specific direction, a first phase plate arranged between the first linear polarizer and the illumination lens array to convert a polarized mode of the incident light from the linearly polarized light to a circularly polarized light, and vice versa, a second phase plate arranged behind the illumination lens array to convert the polarized mode of the incident light from the linearly polarized light to the circularly polarized light, and vice versa, and a second linear polarizer arranged between the second phase plate and the polarized beam splitter on a same light path to transmit the linearly polarized light of the incident light in the specific direction, wherein a reflective light on an internal optical surface of the illumination system is eliminated using the first phase plate, the second phase plate, the first linear polarizer and the second linear polarizer.

Preferably, the internal optical surface of the illumination system includes random surfaces of the color separation unit and the illumination lens array.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, the present invention is characterized in eliminating color intrusion using a phase plate and a linearly polarizing plate. And, first and second embodiments of the present invention are described according to the numbers and arrangement methods of phase plates and linearly polarizing plates.

First Embodiment

A first embodiment of the present invention is characterized in preventing a specific color light reflected on an inner optical surface of an illumination lens array from reentering an area of another color on a display panel using a plurality of phase plates and one linear polarizer to prevent color intrusion.

Figure 1:
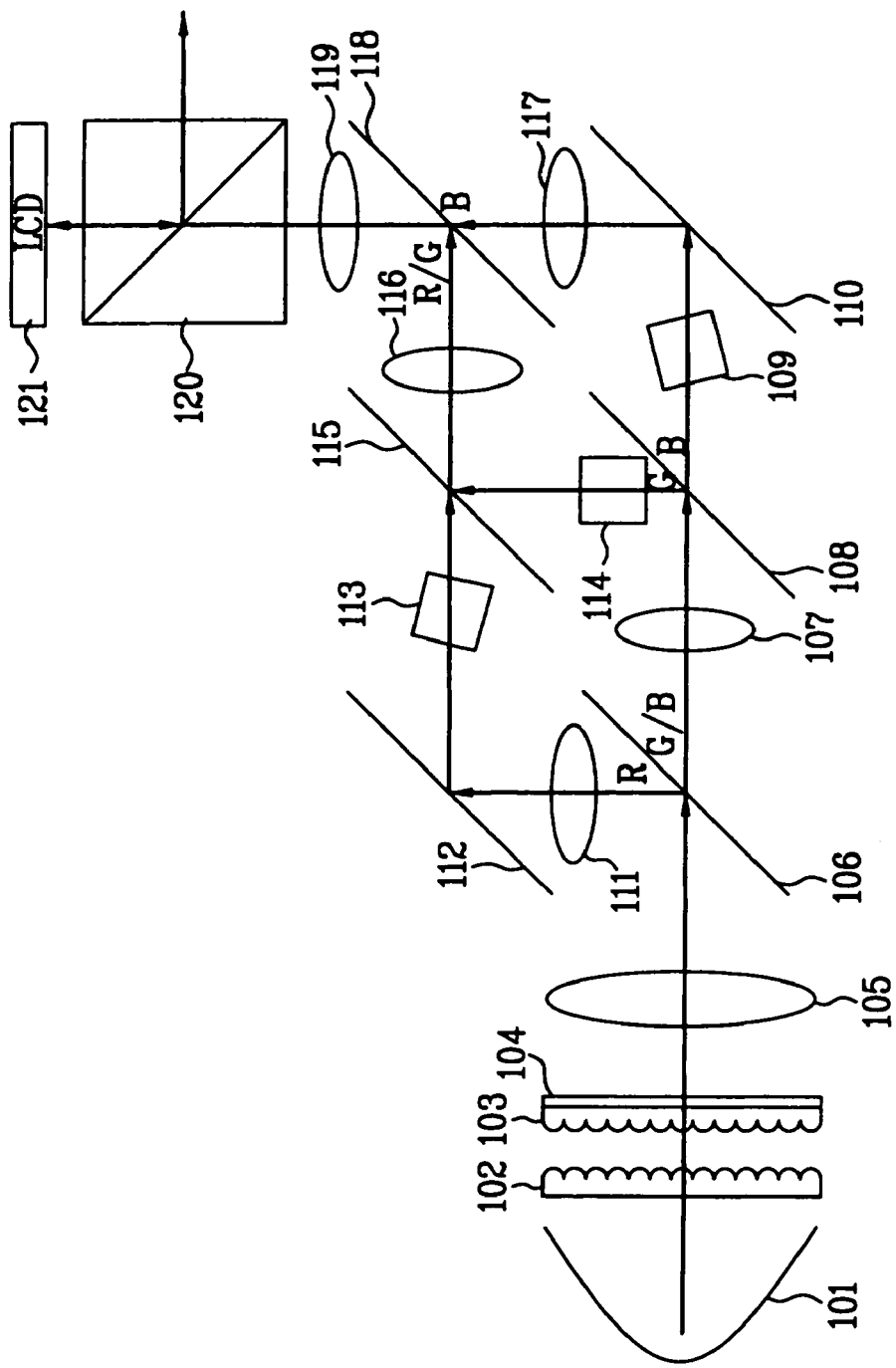
FIG. 1 is a configurational diagram of an illumination system using a rotating prism in a single panel projection display device according to a related art.
Figure 2:
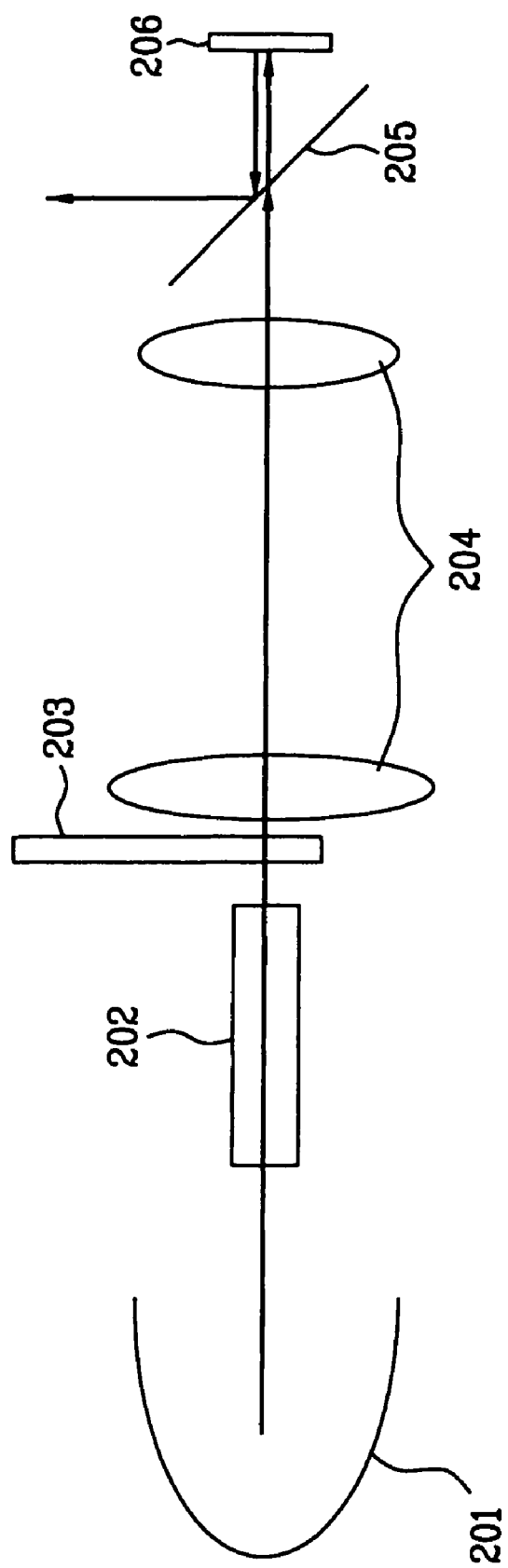
FIG. 2 is a configurational diagram of an illumination system using a color wheel in a single panel projection display device according to a related art.
Figure 3:
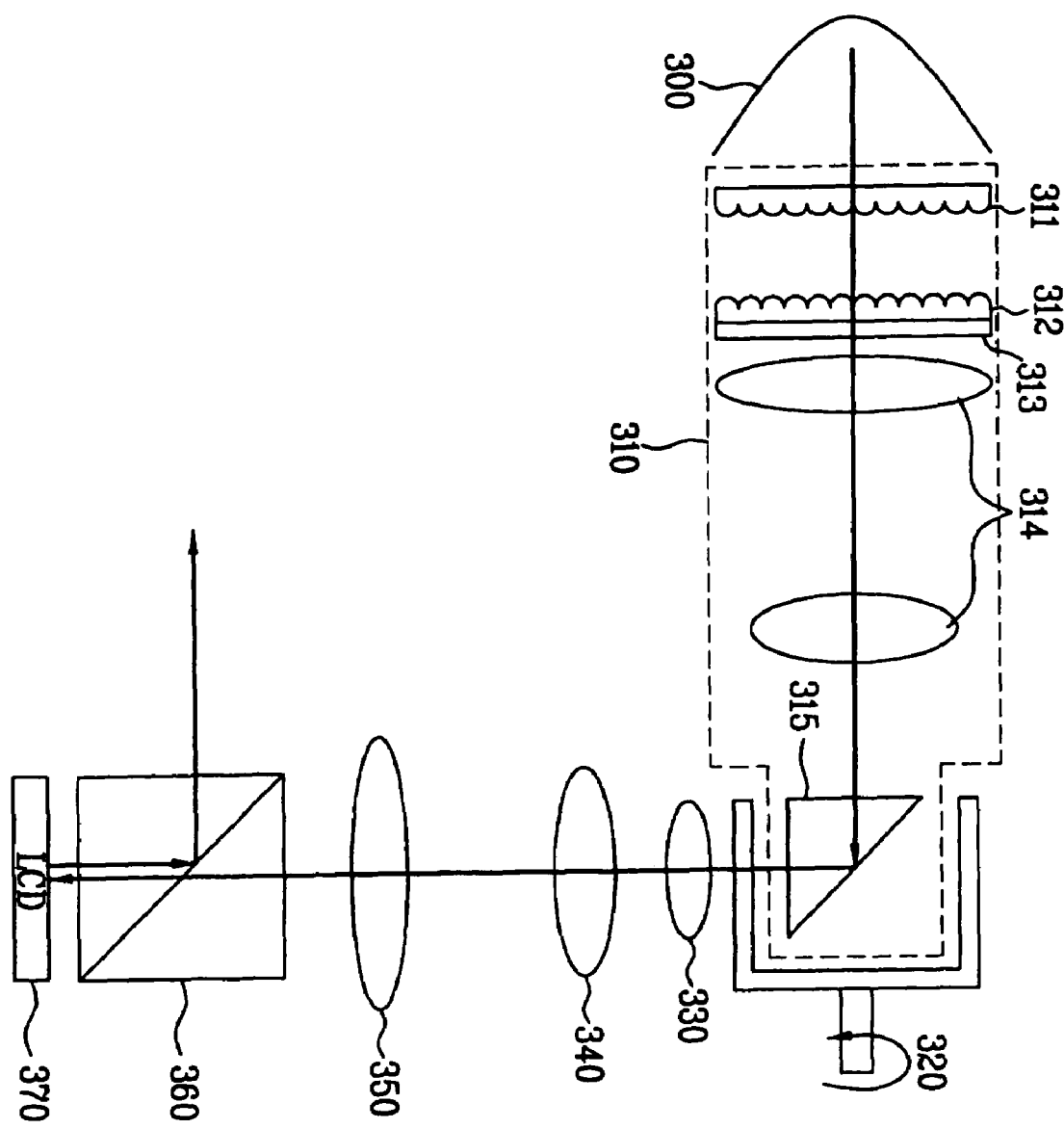
FIG. 3 is a configurational diagram of an illumination system using a color drum in a single panel projection display device according to a related art.
Figure 4:
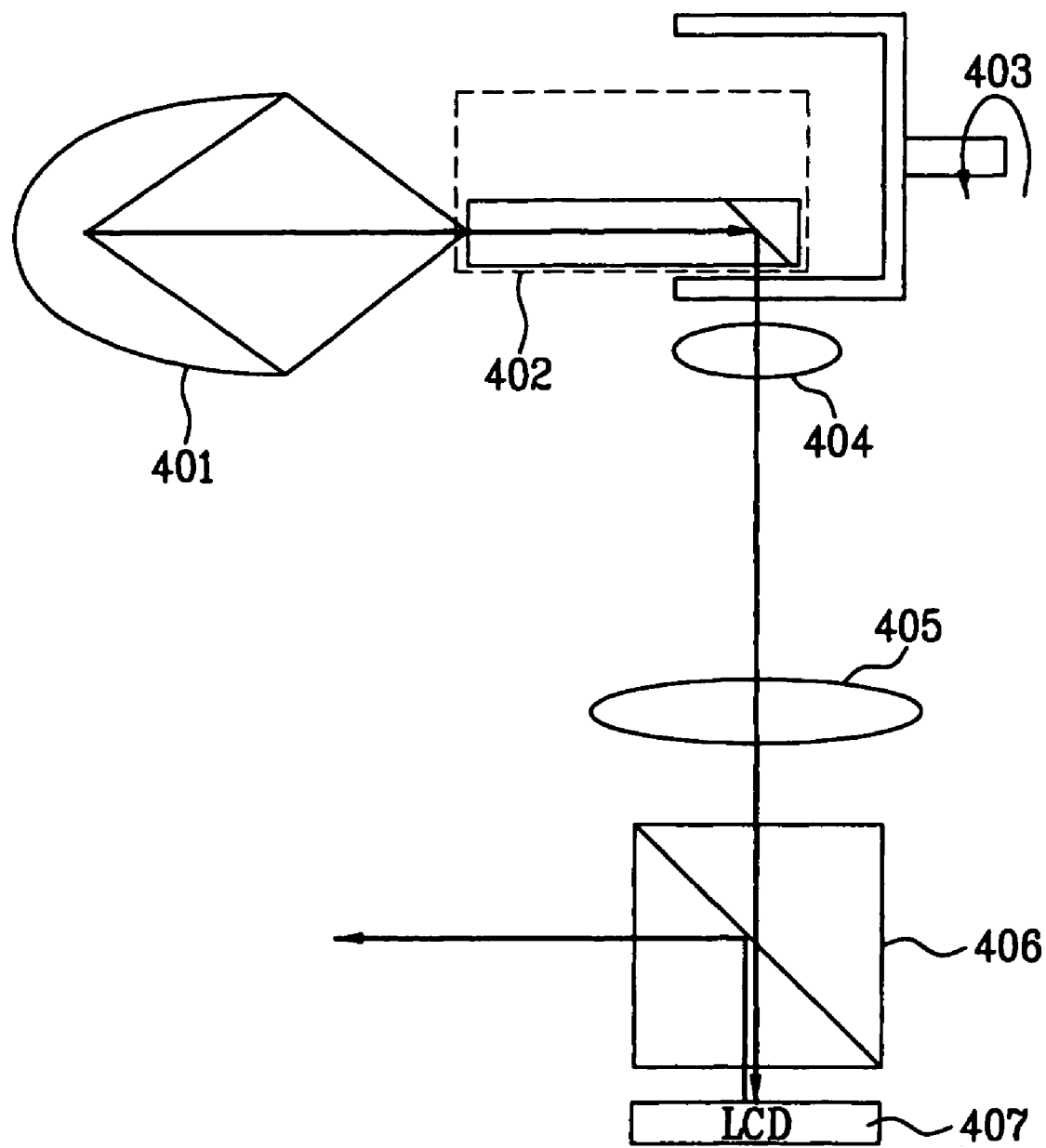
FIG. 4 is a configurational diagram of another illumination system using a color drum in a single panel projection display device according to a related art.
Figure 5:
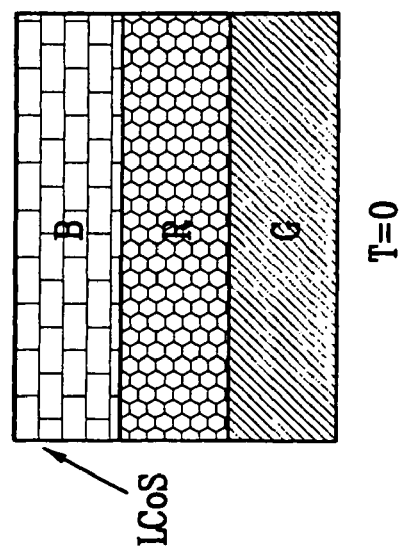
FIG. 5 is a diagram for explaining a color scrolling method by the rotating prism of FIG. 1 in a single panel projection display device.
Figure 5:
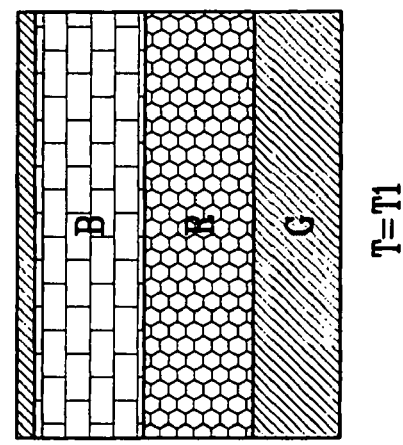
Figure 5:
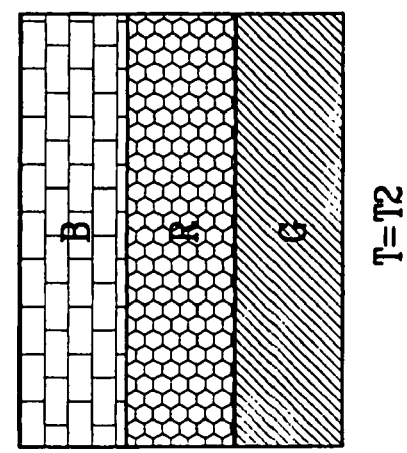
Figure 6:
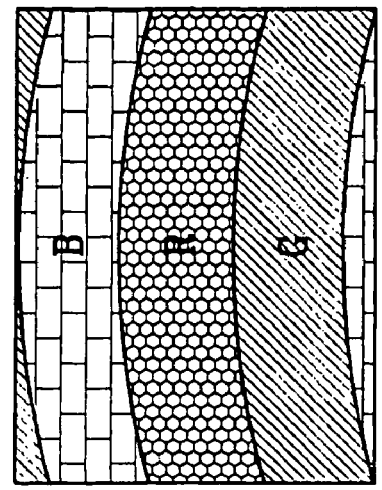
FIG. 6 is a diagram for explaining a color scrolling method by the color wheel of FIG. 2 in a single panel projection display device.
Figure 6:
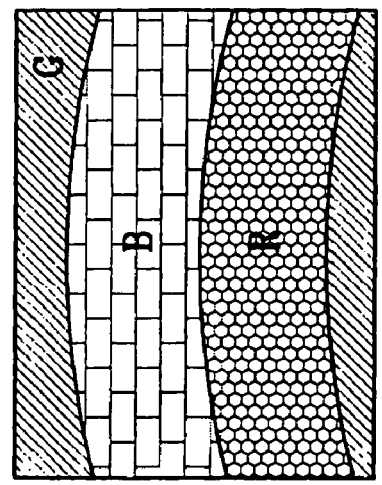
Figure 6:
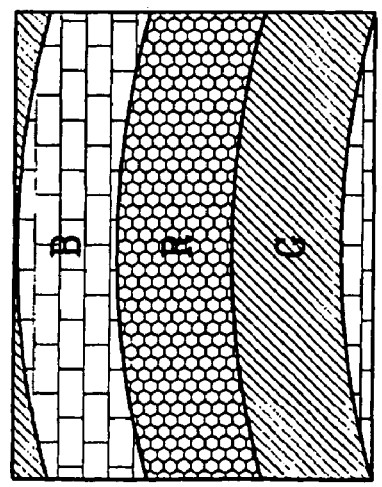
Figure 7:
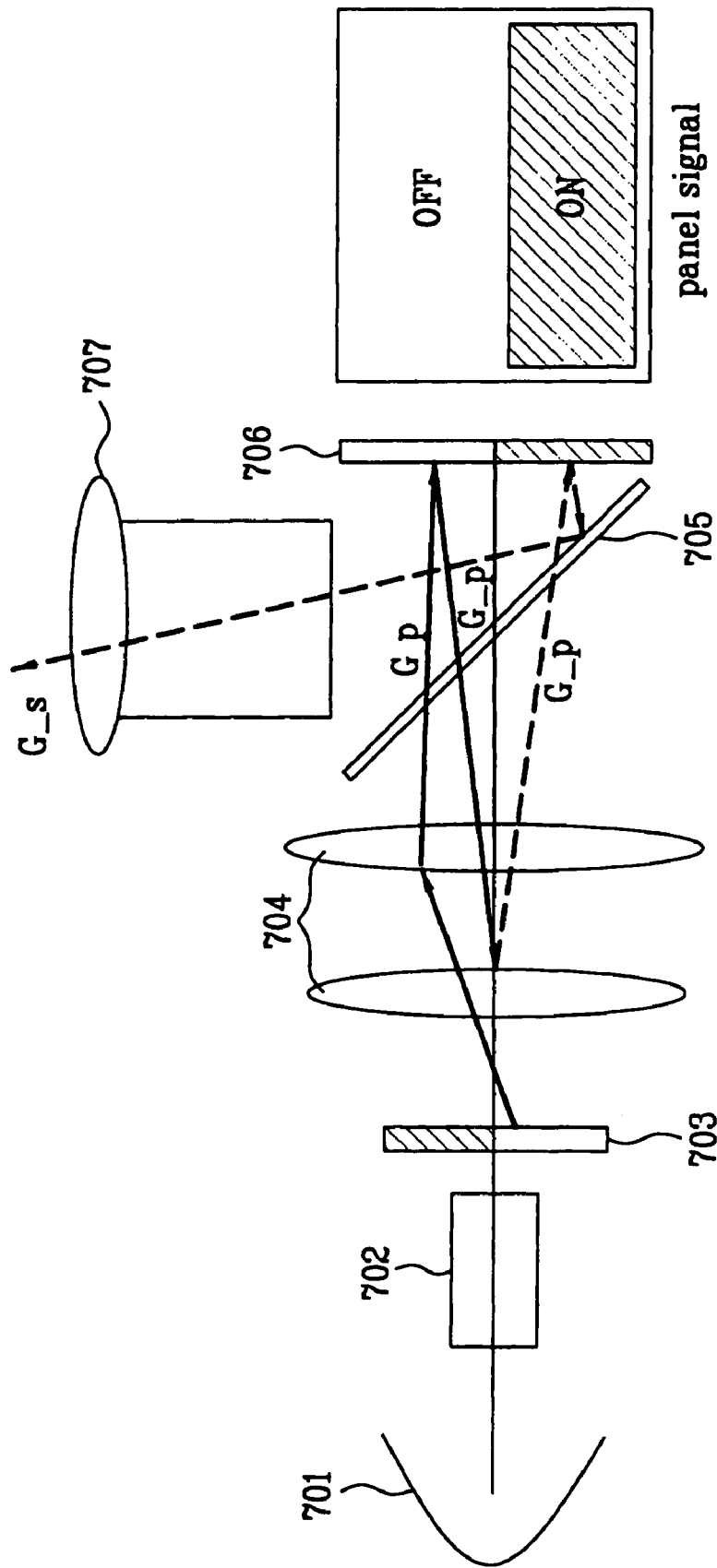
FIG. 7 is a diagram for explaining an example of occurrence of color intrusion at a random moment in case of implementing an entire screen with red in an illumination system of a single panel projection display device according to a related art.
Figure 8:
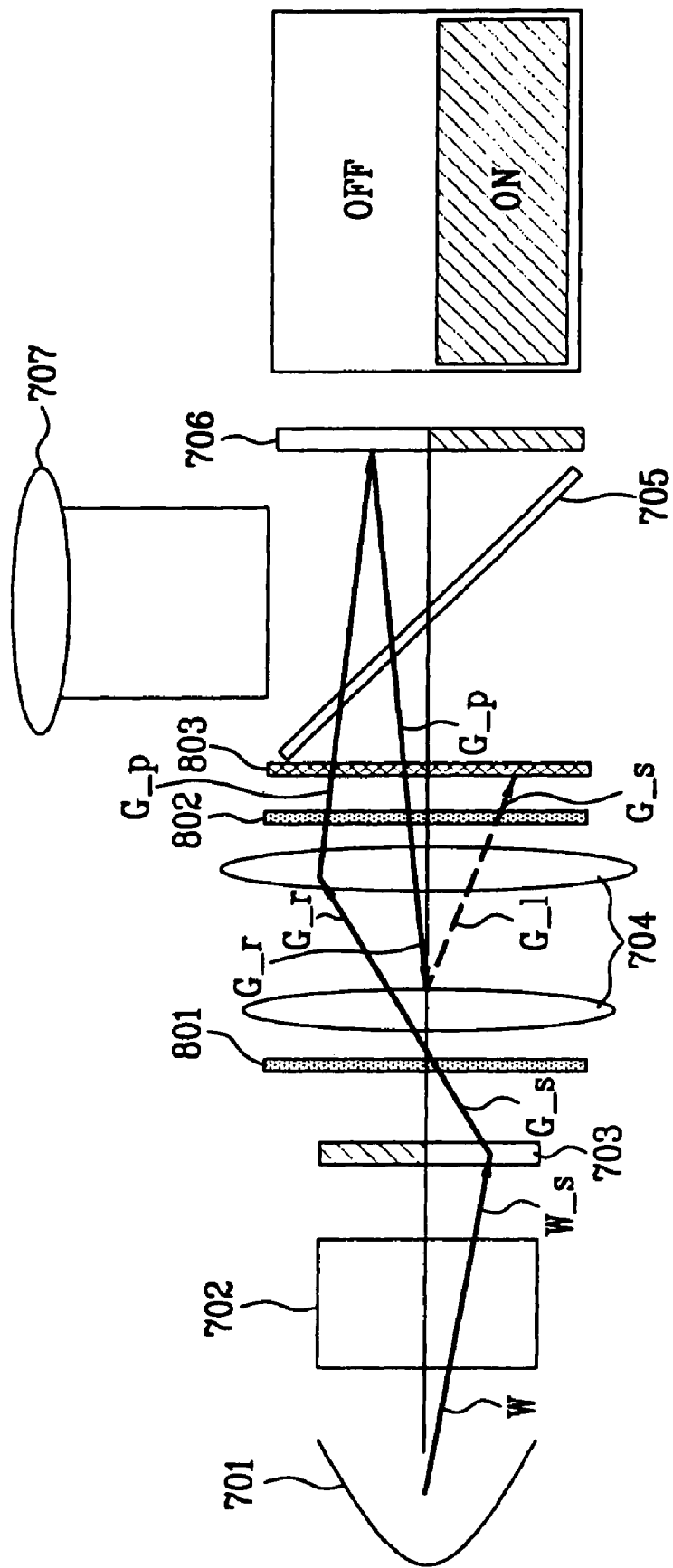
FIG. 8 is a configurational diagram of an illumination system in a single panel projection display apparatus according to a first embodiment of the present invention.

FIG. 8 is a configurational diagram of an illumination system in a single panel projection display apparatus according to a first embodiment of the present invention.

Referring to FIG. 8, an illumination system in a single panel projection display apparatus according to a first embodiment of the present invention includes a light source 701 generating non-polarized white light, a polarization control unit 702 homogenizing to convert the white light of the light source 701 to a linearly polarized light, a color separation unit 703 splitting the linearly polarized light into R, G and B lights by a color scrolling method, an illumination lens array 704 including at least one lens to condense the R, G and B lights sequentially split by the color separation unit 703, and a display panel 706 having different areas on which the R, G and B lights via the illumination lens array 704 are scrolled to be sequentially imaged thereon. And, the above-explained elements of the illumination system are aligned on the same light path. Namely, the display panel 706 scrolls R, G and B signals to cope with the incident R, G and B lights of which imaging positions are scrolled.

The polarization control unit 702 includes an integrator homogenizing the non-polarized white light and a polarizing converter converting the homogenized white light in a direction of either an S- or P-wave. In the first embodiment of the present invention, the non-polarized white light is converted to an S-wave linearly polarized light.

The color separation unit 803 can include any device for performing color separation by the color scrolling method such as a color drum, a color wheel, a rotating prism and the like.

A first phase plate 801 converting a polarized mode is arranged between the color separation unit 703 and the illumination lens array 704, and a second phase plate 802 and a linear polarizer 803 transmitting a specific polarized light are sequentially arranged between the illumination lens array 704 and a PBS 705.

A λ/4 plate converting a polarized mode to a linearly polarized light from a circularly polarized light, and vice versa, is used as each of the first and second phase plates 801 and 802.

In this case, polarizing directions of the first and second phase plates 801 and 802 can be set parallel or vertical to each other. In the first embodiment of the present invention, the polarizing directions of the first and second phase plates 901 and 902 are arranged vertical to each other for example. Specifically, the first phase plate 801 converts the S-wave linearly polarized light to a right-hand circularly polarized light and converts a P-wave linearly polarized light to a left-hand circularly polarized light. And, the second phase plate 802 converts the P-wave linearly polarized light to a right-hand circularly polarized light and converts the S-wave linearly polarized light to a left-hand circularly polarized light.

Moreover, the linear polarizer 803 is arranged to transmit the P-wave linearly polarized light only. In doing so, the linear polarizer 803 reflects or absorbs the S-wave linearly polarized light and is just capable of cutting off the S-wave linearly polarized light.

Namely, in the configuration of the illumination system according to the first embodiment of the present invention, the color separation unit 703, the first phase plate 801, the illumination lens array 704, the second phase plate 802 and the linear polarizer 803 are sequentially arranged to eliminate the color intrusion.

In the above-configured first embodiment of the present invention, an ON signal is applied to a red-light illuminated area of the display panel 706 and an OFF signal is applied to a green and blue light illuminated area of the display panel 704 to implement a red color on an entire screen.

In doing so, the white light W projected from the light source 701 is homogenized by the polarization control unit 702 including the integrator and polarizing converter and is then converted to the S-wave linearly polarized light W_s to proceed to the color separation unit 703. The color separation unit sequentially splits the white light into lights of R, G and B areas, respectively by a scrolling method.

For instance, the light having passed through a green portion of the color separation unit 703 becomes the S-wave linearly polarized light G_s of a green wavelength band and the S-wave linearly polarized green light G_s is projected on the first phase plate 801.

Once having passed through the first phase plate 801, the S-wave linearly polarized green light G_s is converted to a left-hand circularly polarized green light G_l or a right-hand circularly polarized green light G_r. In the embodiment of the present invention, the first phase plate 801 is arranged so that the S-wave linearly polarized light having passed through the first phase plate 801 is converted to the right-hand circularly polarized light.

The right-hand circularly polarized green light G_r projected from the first phase plate 801 proceeds to the second phase plate 802 via the illumination lens array 704.

The right-hand circularly polarized green light G_r is converted to a P-wave linearly polarized green light G_p by the second phase plate 802 and the converted P-wave linearly polarized green light G_p then proceeds to the linear polarizer 803.

Since the linear polarizer 803 is manufactured and arranged to allow the P-wave linearly polarized light only, the P-wave linearly polarized green light G_p is transmitted through the linear polarizer 803 to be incident on the PBS 705.

In doing so, since the PBS 705 is manufactured and arranged to transmit the P-wave linearly polarized light and to reflect the S-wave linearly polarized light as well, the P-wave linearly polarized green light G_p is transmitted through the PBS 705 to be illuminated on a green signal area of the display panel 706. In the present invention, an ON signal is applied to a red-light illuminated area of the display panel 706 and an OFF signal is applied to a green and blue light illuminated area of the display panel 704 to implement a red color on an entire screen. Hence, a green area signal becomes an OFF state at a random moment.

This means that the green light illuminated on the green signal area of the display panel does not change its polarized direction but is reflected. Namely, the P-wave linearly polarized green light G_p maintaining its P-wave linear polarization is reflected on the green signal area to be incident on the PBS 705.

In doing so, since the red signal area is in an ON state, a P-wave linearly polarized red light changes its polarized direction into S-wave linear polarization to be reflected to the PBS 705.

The PBS 705 transmits the P-wave linearly polarized green light G_p to the linear polarizer 803 and reflects the S-wave linearly polarized red light in a direction of the projection lens 707. Namely, the green light is unable to proceed to the projection lens 707 to fail in appearing on a screen. Since the red light is projected to the projection lens 707 only, the screen maintains an enlarged and projected red image thereon.

The linear polarizer 803 transmits the P-wave linearly polarized green light G_p, which has been transmitted through the PBS 705, to the second phase plate 802.

The P-wave linearly polarized green light G_p is converted to a right-hand circularly polarized green light G_l by the second phase plate 802 to proceed to the illumination lens array 704. And, a portion of the right-hand circularly polarized green light is reflected on a random surface of the illumination lens array 704 like a dotted line in FIG. 8. In doing so, the green light reflected on the random surface of the illumination lens arrays 704 is converted to a left-hand polarized light G_l from a right-hand polarized light G_r.

The left-hand circularly polarized green light reflected on the illumination lens array 704 proceeds to the second phase plate 802. The left-hand circularly polarized green light G_l is converted to an S-wave linearly polarized green light G_s by the second phase plate 802 to proceed to the linear polarizer 803.

Since the linear polarizer 803 is configured to cut off the S-wave linearly polarized light, the S-wave linearly polarized green light G_s is cut off by the linear polarizer 803. Hence, the green light reflected on the illumination lens array 704 is not illuminated on the red area of the display panel 706 to prevent the color intrusion. The same operation is applied to the blue light so that the blue light reflected on the illumination lens array 704 is not illuminated on the red area of the display panel 706 to prevent the color intrusion.

Alternatively, the first embodiment of the present invention can eliminate the color intrusion using the second phase plate 802 and the linear polarizer 803 without using the first phase plate 801. In this case, the costs can be lowered but light loss is generated from the linear polarizer 803.

Namely, the S-wave linearly polarized red light through the color separation unit 703 and the illumination lens array 704 is converted to the left-hand circularly polarized red light by the second phase plate 802 to proceed to the linear polarizer 803. In doing so, the circularly polarized light includes the S-wave linearly polarized light of 50% and the P-wave linearly polarized light of 50%, the P-wave linearly polarized light amounting to 50% of the left-hand circularly polarized light is transmitted through the linear polarizer 803 to proceed to the PBS 705. In doing so, since the S-wave linearly polarized light is cut off by the linear polarizer 803, 50% light loss takes place.

Hence, in the first embodiment of the present invention, a use of the first phase plate 801 is optional according to a design purpose and usage of system. For instance, in case that costs are taken into consideration only, the system is configured without using the first phase plate 801. In case that image quality is taken into consideration, i.e., in case of eliminating the color intrusion without light loss, the system is configured using the first phase plate 801. Since the object of the present invention is to enhance image quality, the first phase plate 801 is preferably used.

Second Embodiment

A second embodiment of the present invention is characterized in preventing a specific color light reflected on a color filter and an inner optical surface of an illumination lens array from reentering an area of another color on a display panel using a plurality of phase plates and a plurality of linear polarizers to prevent color intrusion.

Figure 9:
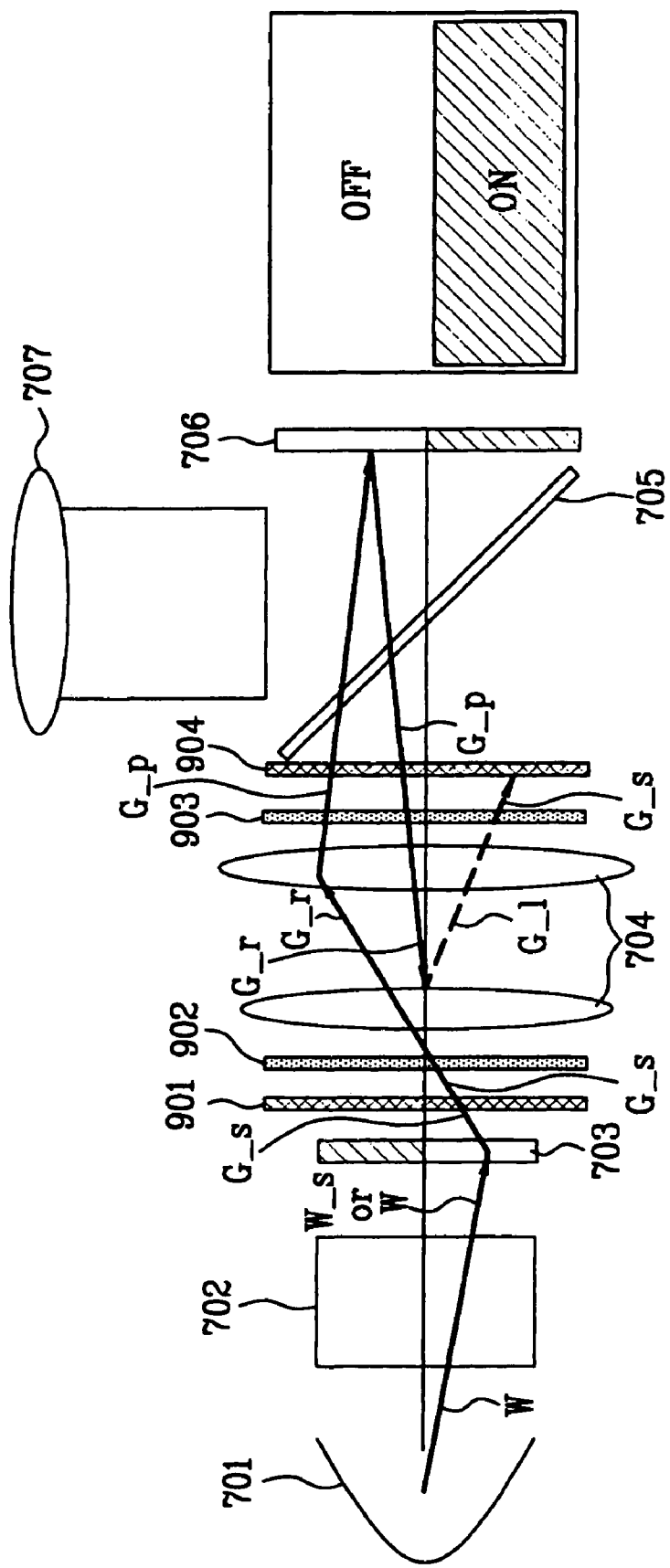
FIG. 9 is a configurational diagram of an illumination system in a single panel projection display apparatus according to a second embodiment of the present invention.

FIG. 9 is a configurational diagram of an illumination system in a single panel projection display apparatus according to a second embodiment of the present invention.

Referring to FIG. 9, an illumination system in a single panel projection display apparatus according to a second embodiment of the present invention includes a light source 701, a polarization control unit 702, a color separation unit 703, an illumination lens array 704, and a display panel 706. And, the above-explained elements of the illumination system are aligned on the same light path like those in FIG. 8. Yet, they can be modified as well.

A first linear polarizer 901 transmitting a specific polarized light only and a first phase plate 902 converting a polarized mode are sequentially arranged between the color separation unit 703 and the illumination lens array 704. And, a second phase plate 903 and a second linear polarizer 904 are sequentially arranged between the illumination lens array 704 and a PBS 705.

A λ/4 plate converting a polarized mode to a linearly polarized light from a circularly polarized light, and vice versa, is used as each of the first and second phase plates 902 and 903. In this case, polarizing directions of the first and second phase plates 902 and 903 can be set parallel or vertical to each other. In the second embodiment of the present invention, the polarizing directions of the first and second phase plates 902 and 903 are arranged vertical to each other for example. Specifically, the first phase plate 902 converts an S-wave linearly polarized light to a right-hand circularly polarized light and converts a P-wave linearly polarized light to a left-hand circularly polarized light. And, the second phase plate 903 converts the P-wave linearly polarized light to a right-hand circularly polarized light and converts the S-wave linearly polarized light to a left-hand circularly polarized light.

Moreover, an S-wave linear polarizer transmitting an S-wave linearly polarized light only is used as the first linear polarizer 901. And, a P-wave linear polarizer transmitting a P-wave linearly polarized light only is used as the second linear polarizer 904. Namely, the first linear polarizer 901 cuts off the P-wave linearly polarized light and the second linear polarizer cuts off the S-wave linearly polarized light.

Namely, in the configuration of the illumination system according to the second embodiment of the present invention, the color separation unit 703, the first linear polarizer 901, the first phase plate 902, the illumination lens array 704, the second phase plate 903 and the second linear polarizer 904 are sequentially arranged.

In the above-configured second embodiment of the present invention, it is assumed that an ON signal is applied to a red-light illuminated area of the display panel 706 and that an OFF signal is applied to a green and blue light illuminated area of the display panel 704 to implement a red color on an entire screen.

In doing so, the white light W projected from the light source 701 is homogenized by the polarization control unit 702 including an integrator and polarizing converter and is then converted to the S-wave linearly polarized light W_s to proceed to the color separation unit 703. The color separation unit sequentially splits the white light into lights of R, G and B areas, respectively by a scrolling method.

For instance, the light having passed through a green portion of the color separation unit 703 becomes the S-wave linearly polarized light G_s of a green wavelength band and the S-wave linearly polarized green light G_s is then transmitted through the first linear polarizer 901 to proceed to the first phase plate 902.

Once having passed through the first phase plate 902, the S-wave linearly polarized green light G_s is converted to a left-hand circularly polarized green light G_l or a right-hand circularly polarized green light G_r. In the embodiment of the present invention, the first phase plate 902 is arranged so that the S-wave linearly polarized light having passed through the first phase plate 902 is converted to the right-hand circularly polarized light.

The right-hand circularly polarized green light G_r projected from the first phase plate 902 proceeds to the second phase plate 903 via the illumination lens array 704.

The right-hand circularly polarized green light G_r is converted to a P-wave linearly polarized green light G_p by the second phase plate 903 and the converted P-wave linearly polarized green light G_p then proceeds to the second linear polarizer 904.

Since the second linear polarizer 904 is the P-wave polarizer, the P-wave linearly polarized green light G_p is transmitted through the second linear polarizer 904 to be incident on the PBS 705.

In doing so, since the PBS 705 is manufactured and arranged to transmit the P-wave linearly polarized light and to reflect the S-wave linearly polarized light, the P-wave linearly polarized green light G_p is transmitted through the PBS 705 to be illuminated on a green signal area of the display panel 706. In the present invention, an ON signal is applied to a red-light illuminated area of the display panel 706 and an OFF signal is applied to a green and blue light illuminated area of the display panel 704 to implement a red color on an entire screen. Hence, a green area signal becomes an OFF state at a random moment.

This means that the green light illuminated on the green signal area of the display panel does not change its polarized direction but is reflected. Namely, the P-wave linearly polarized green light G_p maintaining its P-wave linear polarization is reflected on the green signal area to be incident on the PBS 705.

In doing so, since the red signal area is in an ON state, a P-wave linearly polarized red light changes its polarized direction into S-wave linear polarization to be reflected to the PBS 705.

The PBS 705 transmits the P-wave linearly polarized green light G_p to the second linear polarizer 904 and reflects the S-wave linearly polarized red light in a direction of the projection lens 707. Namely, the green light is unable to proceed to the projection lens 707 to fail in appearing on a screen. Since the red light is projected to the projection lens 707 only, the screen maintains an enlarged and projected red image thereon.

The second linear polarizer 904 transmits the P-wave linearly polarized green light G_p, which has been transmitted through the PBS 705, to the second phase plate 903.

The P-wave linearly polarized green light G_p is converted to a right-hand circularly polarized green light G_l by the second phase plate 903 to proceed to the illumination lens array 704. And, a portion of the right-hand circularly polarized green light is reflected on a random surface of the illumination lens array 704 like a dotted line in FIG. 9. In doing so, the green light reflected on the random surface of the illumination lens arrays 704 is converted to a left-hand polarized light G_l from a right-hand polarized light G_r.

The left-hand circularly polarized green light reflected on the illumination lens array 704 proceeds to the second phase plate 903. The left-hand circularly polarized green light G_l is converted to an S-wave linearly polarized green light G_s by the second phase plate 903 to proceed to the second linear polarizer 904.

Since the second linear polarizer 904 is configured to cut off the S-wave linearly polarized light, the S-wave linearly polarized green light G_s is cut off by the second linear polarizer 904. Hence, the green light reflected on the illumination lens array 704 is not illuminated on the red area of the display panel 706 to prevent the color intrusion. The same operation is applied to the blue light so that the blue light reflected on the illumination lens array 704 is not illuminated on the red area of the display panel 706 to prevent the color intrusion.

Meanwhile, the right-hand circularly polarized green light G_p transmitted through the illumination lens array 704 without being reflected on the random surface of the illumination lens array 704 is converted to an S-wave linearly polarized green light G_s to proceed to the first linear polarizer 901. Since the first linear polarizer 901 is the S-wave linear polarizer, the S-wave linearly polarized light G_s proceeds to the color separation unit 703. And, a portion of the S-wave linearly polarized green light is reflected on the color separation unit 703 to proceed to the first linear polarizer 901. In this case, since the green light reflected on the color separation unit 704 is the linearly polarized light converted from the S-wave to the P-wave, the P-wave linearly polarized green light G_p is cut off by the first linear polarizer 901 that is the S-wave polarizer.

Hence, the second embodiment of the present invention prevents the color intrusion of the green light reflected on the color separation unit 703 as well as the color intrusion of the green light reflected on the illumination lens array 704. The same operation is applied to the blue light so that the blue light reflected on the illumination lens array 704 is not illuminated on the red area of the display panel 706 to prevent the color intrusion.

In the present invention, more applications of the number and arrangement of the phase plates and linear polarizers can be widely modified. Hence, the present invention is not limited to the aforesaid first and second embodiments.

By the illumination system and projection system using the same according to the present invention, the reflective light on the internal optical surface of the optical system can be eliminated using the phase plate and linear polarizer in the color sequential driving of illuminating at least two colors on the single display panel at a random moment. Therefore, the present invention prevents the degradation of color purity generated from the mutual intrusion of light of at least two colors, thereby enhancing quality of color image.

Meanwhile, the terminologies used in the description of the present invention are defined to take the functions in the present invention into consideration and may vary according to intentions or conventions of those skilled in the art. Hence, the definitions of the terminologies should be made based on the overall contents of the present invention.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An illumination system comprising:
   a color separation unit homogenizing a non-polarized white light originated from a light source, converting the homogenized light to a polarized light in a specific direction, and splitting the polarized light into R, G and B lights by color scrolling;
   an illumination lens array condensing an incident light;
   a first phase plate arranged between the color separation unit and the illumination lens array to convert a polarized mode of the incident light;
   a second phase plate converting the polarized mode of the incident light; and
   a linear polarizer transmitting a linearly polarized light of the incident light in the specific direction,
   wherein the first phase plate is a λ/4 plate converting the linearly polarized light of the incident light to a circularly polarized light or the circularly polarized light of the incident light to the linearly polarized light, and wherein the second phase plate and the linear polarizer are sequentially arranged between the illumination lens array and a display panel to eliminate a reflective light on an internal optical surface of the illumination system.

2. The illumination system of claim 1, wherein the $\lambda/4$ plate converts an S-wave linearly polarized light of the incident light to a right-hand circularly polarized light or a P-wave linearly polarized light of the incident light to a left-hand circularly polarized light.

3. The illumination system of claim 1, wherein the second phase plate is a $\lambda/4$ plate converting the linearly polarized light of the incident light to a circularly polarized light or the circularly polarized light of the incident light to the linearly polarized light.

4. The illumination system of claim 3, wherein the $\lambda/4$ plate converts an S-wave linearly polarized light of the incident light to a right-hand circularly polarized light or a P-wave linearly polarized light of the incident light to a left-hand circularly polarized light.

5. The illumination system of claim 1, wherein the linear polarizer transmits a P-wave linearly polarized light of the incident light or cuts off an S-wave linearly polarized light of the incident light.

6. The illumination system of claim 1, wherein polarizing directions of the first and second phase plates are arranged parallel to each other.

7. The illumination system of claim 1, wherein polarizing directions of the first and second phase plates are arranged vertical to each other.

8. The illumination system of claim 1, wherein the internal optical surface of the illumination system is a random surface of the illumination lens array.

9. The illumination system of claim 1, further comprising a linear polarizer between the color separation unit and the first phase plate to transmit the linearly polarized light of the incident light in the specific direction.

10. The illumination system of claim 9, wherein the linear polarizer transmits an S-wave linearly polarized light of the incident light or cuts off a P-wave linearly polarized light of the incident light.

11. The illumination system of claim 9, wherein the internal optical surface of the illumination system includes random surfaces of the color separation unit and the illumination lens array.

12. A projection display apparatus, which forms an image by processing a light irradiated from an illumination system according to an inputted image signal using a single display panel and which enlarges to project the image toward a screen via a projection lens, the illumination system comprising:

a color separation unit homogenizing a non-polarized white light originated from a light source, converting the homogenized light to a polarized light in a specific direction, and splitting the polarized light into R, G and B lights by color scrolling;

an illumination lens array comprising at least one lens to condense an incident light;

a polarized beam splitter transmitting or reflecting an incident light according to a polarized direction of the incident light;

a first phase plate arranged between the color separation unit and the illumination lens array to convert a polarized mode of the incident light from a linearly polarized light to a circularly polarized light, and vice versa;

a second phase plate arranged in rear of the illumination lens array to convert the polarized mode of the incident light from the linearly polarized light to the circularly polarized light, and vice versa; and a linear polarizer sequentially aligned between the second phase plate and the polarized beam splitter on a same light path to transmit the linearly polarized light of the incident light in the specific direction, wherein the first phase plate is a $\lambda/4$ plate converting an S-wave linearly polarized light of the incident light to a right-hand circularly polarized light or a P-wave linearly polarized light of the incident light to a left-hand circularly polarized light, and wherein a reflective light on an internal optical surface of the illumination system is eliminated using the first phase plate, the second phase plate and the linear polarizer.

13. The projection display apparatus of claim 12, wherein the second phase plate is a $\lambda/4$ plate converting a P-wave linearly polarized light of the incident light to a right-hand circularly polarized light or an S-wave linearly polarized light of the incident light to a left-hand circularly polarized light.

14. The projection display apparatus of claim 12, wherein the linear polarizer is a P-wave polarizer transmitting a P-wave linearly polarized light of the incident light or cuts off an S-wave linearly polarized light of the incident light.

15. The projection display apparatus of claim 12, further comprising a linear polarizer between the color separation unit and the first phase plate to transmit the linearly polarized light of the incident light in the specific direction.

16. The projection display apparatus of claim 15, wherein the linear polarizer is an S-wave polarizer transmitting an S-wave linearly polarized light of the incident light or cuts off a P-wave linearly polarized light of the incident light.

17. A projection display apparatus, which forms an image by processing a light irradiated from an illumination system according to an inputted image signal using a single display panel and which enlarges to project the image toward a screen via a projection lens, the illumination system comprising:

a color separation unit homogenizing a non-polarized white light originated from a light source, converting the homogenized light to a polarized light in a specific direction, and splitting the polarized light into R, G and B lights by color scrolling;

an illumination lens array comprising at least one lens to condense an incident light;

a polarized beam splitter transmitting or reflecting an incident light according to a polarized direction of the incident light;

a first linear polarizer behind the color separation unit to transmit a linearly polarized light of the incident light in the specific direction;

a first phase plate arranged between the first linear polarizer and the illumination lens array to convert a polarized mode of the incident light from the linearly polarized light to a circularly polarized light, and vice versa;

a second phase plate arranged behind the illumination lens array to convert the polarized mode of the incident light from the linearly polarized light to the circularly polarized light, and vice versa; and a second linear polarizer arranged between the second phase plate and the polarized beam splitter on a same light path to transmit the linearly polarized light of the incident light in the specific direction, wherein a reflective light on an internal optical surface of the illumination system is eliminated using the first phase plate, the second phase plate, the first linear polarizer and the second linear polarizer.

18. The projection display apparatus of claim 17, wherein the first linear polarizer is an S-wave polarizer transmitting an S-wave linearly polarized light of the incident light or cuts off a P-wave linearly polarized light of the incident light.

19. The projection display apparatus of claim 17, wherein the first phase plate is a $\lambda/4$ plate converting an S-wave linearly polarized light of the incident light to a right-hand circularly polarized light or a P-wave linearly polarized light of the incident light to a left-hand circularly polarized light.

20. The projection display apparatus of claim 17, wherein the second phase plate is a $\lambda/4$ plate convening a P-wave linearly polarized light of the incident light to a right-hand circularly polarized light or an S-wave linearly polarized light of the incident light to a left-hand circularly polarized light.

21. The projection display apparatus of claim 17, wherein the second linear polarizer is a P-wave polarizer transmitting a P-wave linearly polarized light of the incident light or cuts off an S-wave linearly polarized light of the incident light.

* * * * *